US012374314B1

(12) United States Patent
Hunt

(10) Patent No.: US 12,374,314 B1
(45) Date of Patent: Jul. 29, 2025

(54) ELECTRONIC ILLUMINATED STEEL PAN PERCUSSION INSTRUMENT

(71) Applicant: Brian Hunt, Portsmouth, VA (US)

(72) Inventor: Brian Hunt, Portsmouth, VA (US)

( * ) Notice: Subject to any disclaimer, the term of this patent is extended or adjusted under 35 U.S.C. 154(b) by 617 days.

(21) Appl. No.: 17/701,408

(22) Filed: Mar. 22, 2022

(51) Int. Cl.
*G10H 1/00* (2006.01)
*G10H 1/32* (2006.01)

(52) U.S. Cl.
CPC ............ *G10H 1/0016* (2013.01); *G10H 1/32* (2013.01); *G10H 2230/281* (2013.01); *G10H 2250/435* (2013.01)

(58) Field of Classification Search
CPC .. G10H 1/0016; G10H 1/32; G10H 2230/281; G10H 2250/435
USPC ........................................................ 84/600
See application file for complete search history.

(56) References Cited

U.S. PATENT DOCUMENTS

| | | | | |
|---|---|---|---|---|
| 4,479,412 A * | 10/1984 | Klynas | G10H 3/143 | 84/DIG. 12 |
| 6,586,666 B2 * | 7/2003 | Abe | G10H 1/0016 | 84/411 R |
| 7,030,305 B1 * | 4/2006 | Cupid | G10H 3/12 | 84/738 |
| 8,207,435 B2 * | 6/2012 | Charles | G10D 13/08 | 84/474 |
| 8,674,207 B1 * | 3/2014 | Seymour | G10H 1/0558 | 84/615 |
| 9,035,160 B2 * | 5/2015 | Rapp | G10H 7/00 | 84/723 |
| 2010/0180755 A1 * | 7/2010 | Copeland | G10H 1/0066 | 84/622 |
| 2013/0076542 A1 * | 3/2013 | Tanaka | G10H 3/146 | 200/5 A |
| 2019/0197999 A1 * | 6/2019 | Kodama | G10H 1/344 | |

FOREIGN PATENT DOCUMENTS

| | | | |
|---|---|---|---|
| AU | 2007356753 A8 * | 8/2009 | G10H 1/0066 |
| CA | 2684424 C * | 12/2015 | G10H 1/0066 |
| EP | 3986585 B1 * | 4/2024 | A63H 5/00 |

* cited by examiner

*Primary Examiner* — Christina M Schreiber
(74) *Attorney, Agent, or Firm* — Sanchelima & Associates, P.A.; Jesus Sanchelima; Christian Sanchelima

(57) ABSTRACT

An electronic training steelpan percussion instrument includes integral illuminated color zones on the surface of the pan for teaching a player various notes and cadences. The player strikes the pan on the illuminated zone when it appears. The color zones for the instrument are provided as midi-pads that are configured to send and receive midi signals. The instrument may be operatively connected to a computer or speakers for recording and live performance implementations.

10 Claims, 4 Drawing Sheets

ELECTRONIC ILLUMINATED STEEL PAN PERCUSSION INSTRUMENT

II. BACKGROUND OF THE INVENTION

1. Field of the Invention

The present invention relates to an electronic steel pan instrument and, more particularly, to an electronic illuminated steel pan percussion instrument that comprises integral illuminated color zones for teaching cadences to students.

2. Description of the Related Art

Several designs for electronic steel pans have been designed in the past. None of them, however, include an electronic training steelpan percussion instrument including integral illuminated color zones on the surface of the pan for teaching a player various notes and cadences. The player strikes the pan on the illuminated zone when it appears. The color zones for the instrument are provided as midi-pads that are configured to send and receive midi signals. The instrument may be operatively connected to a computer or speakers for recording and live performance implementations. It is known that teaching cadence and rhythm for instruments is often difficult. Therefore, there is a need for an electronic instrument to aid in teaching cadence and rhythm.

Applicant believes that a related reference corresponds to U.S. Pat. No. 7,030,305 issued for an electronic synthesized steelpan drum apparatus. Applicant believes that another related reference corresponds to U.S. Pat. No. 8,207,435 issued for a tool for assisting in teaching music to a player of a steel pan/drum. However, the cited references differ from the present invention because they fail to disclose the illuminated zones which provide cadence and rhythm to a user.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide an electronic steel pan with illuminated zones which correspond to musical notes to teach cadence and rhythm to a student.

It is another object of this invention to provide an electronic steel pan that can be operatively mounted to speakers for live implementations, and a computer for recording implementations.

It is still another object of the present invention to provide an electronic steel pan that generates midi signals so it can be implemented in computer software for recording and performing implementations.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which.

V. DETAILED DESCRIPTION OF THE EMBODIMENTS OF THE INVENTION

Figure 1:
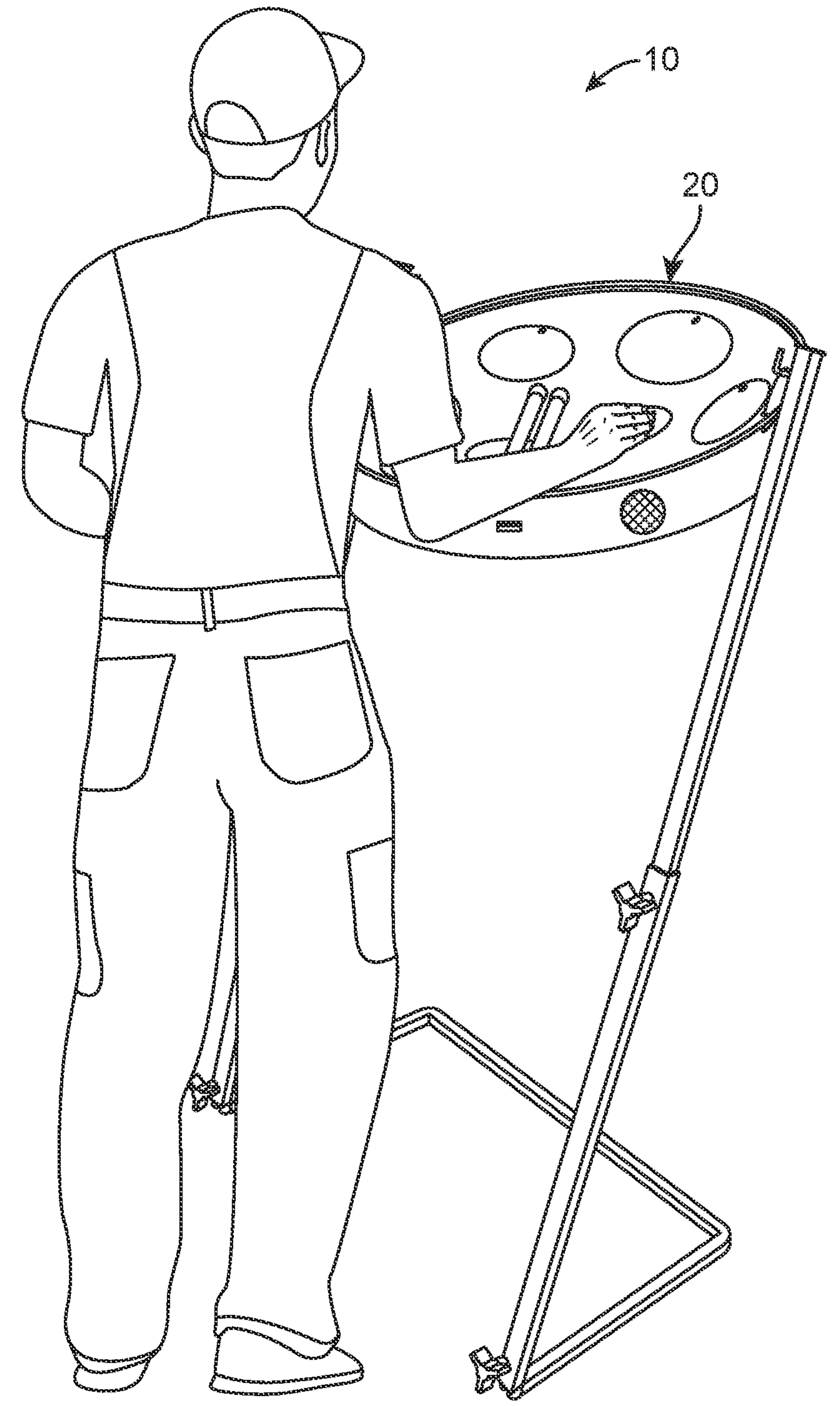
FIG. 1 represents an operational isometric view of the electronic steel pan system 10 in accordance with an embodiment of the present invention.

Referring now to the drawings, where the present invention is generally referred to with numeral 10, it can be observed that it basically includes a steel pan assembly 20 and a electronic assembly 40.

Steel pan assembly 20 includes a body 22 which comprises sidewalls 22A and a top surface 22B. Steel pan assembly 20 can be effectively observed in FIG. 2 of the provided drawings. It can be observed that body 22 resembles that of a traditional steel pan. Sidewalls 22A define a circular outer perimeter structure and supports the top surface 22B. In the present embodiment, top surface 22B is provided as a concave top surface the is depressed within body 22. Other variations may include convex a top surface as is common with traditional steel pans. Positioned along the top surface 22B are touch pads 24. In the present embodiment, touch pads 24 are provided as midi touch pads that are positioned on the top surface 22B to resemble the sticking areas of a traditional steal pan that indicate notes on scale for a given strike or touch. In the present embodiment, touch pads 24 are light up touch pads which broadcast a predetermined color depending on strike or touch. Additionally, touch pads 24 may be instructed by a controller to light up in a predetermined pattern to deliver a rhythm pattern to a user. Touch pads 24, when stricken or touch may generate a sense signal that can be transmitted wirelessly or through wired means. In one embodiment, touch pads 24 may be implemented as capacitive touch sensors. In another embodiment, touch pads 24 may be implemented as resistive touch sensors.

Steel pan assembly 20 further includes a speaker 26 operatively mounted internally along sidewalls 22A of the body 22. Other embodiments may feature a speaker 26 that is operatively connected to body 22 and is positioned entirely separated from body 22. In the present embodiment, speaker 26 will broadcast a note or sound that corresponds to the note or sound that is indicated on the touch pad 24 that is positioned on the top surface 22B. This note or sound may be based on those that are found in traditional steel pan instruments. However, it should be understood that a user may program each of the touch pads 24 to correspond to any note or sound. Steel pan assembly 20 further includes a stand 28 which may be used to support body 22. In the present embodiment, stand 28 includes extension members that are mounted to the sidewalls 22A of the body 22. These extension members are operatively secured to a base on a ground surface.

Figure 3:
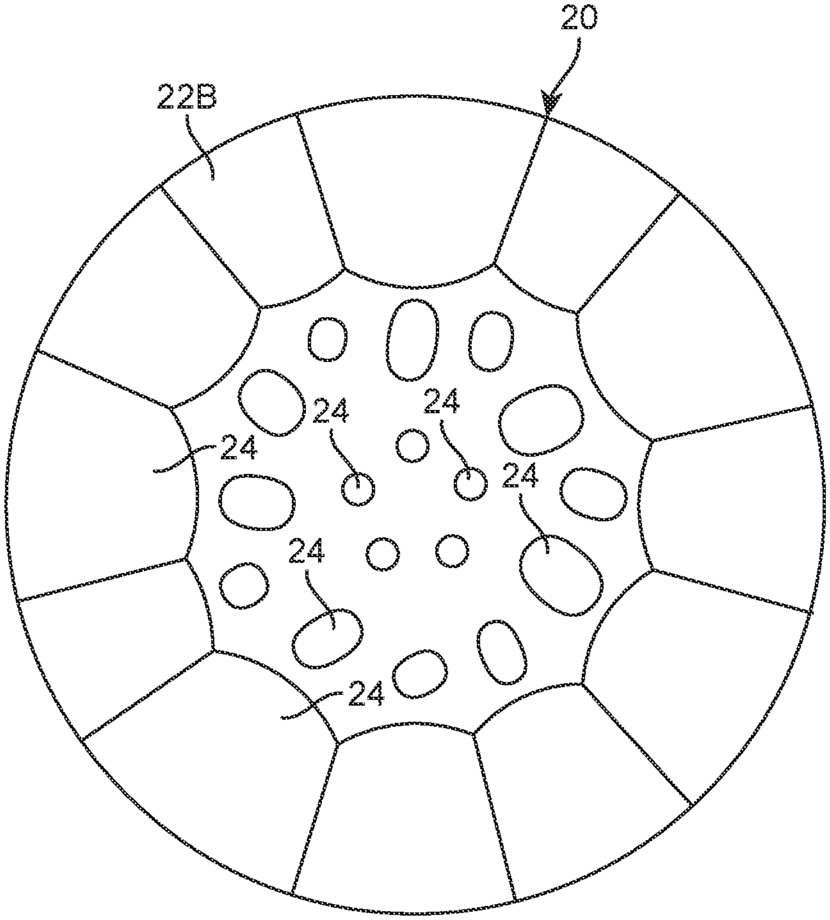
FIG. 3 illustrates a front view of top surface 22 in accordance with an embodiment of the present invention.
Figure 4:
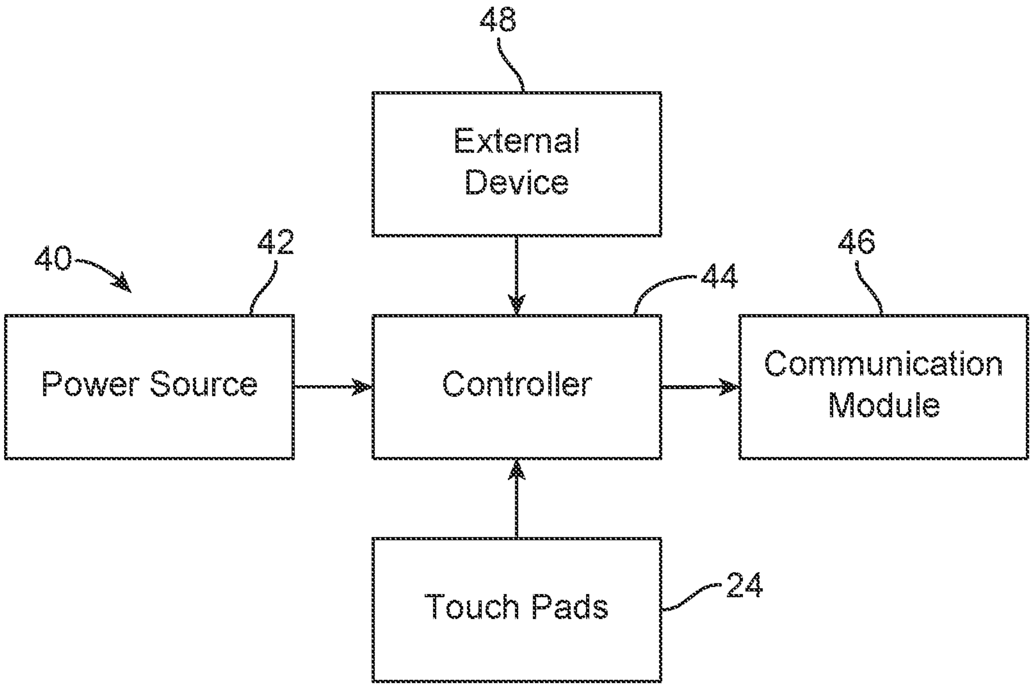
FIG. 4 is a representation of a block diagram representing the electronic assembly 40 in accordance with an embodiment of the present invention.

Electronic assembly 40 includes a plurality of electronic components that are stored either internally or externally from the body 22. In the present embodiment, electronic assembly includes a power source 42 that may be provided as a rechargeable battery within the body. Other variations may include other forms of power sources for the electronics. Power source 42 is operatively connected to a controller 44 which is in communication with the touch pad sensors and speaker of the body assembly. In the present embodiment, the controller 44 includes instructions that are stored in memory, that once executed, cause the system to light up the touch pads in a pattern. The pattern may be a predetermined pattern that could be a rhythmic pattern that corresponds to a pattern of a musical piece of music. A user may then be instructed to strike or touch the pads in the pattern corresponding to the light of the touch pads. This configuration proves effective to teach rhythm to a user learning to play the steel pan. Controller 44 is further configured to broadcast a musical note or sound from speaker 26 that may correspond to a given note or sound for a traditional steal pan. FIG. 3 represents an exemplary configuration of a traditional steel pan where each of the touch pads 24 corresponds to a given note with respective octave.

Figure 2:
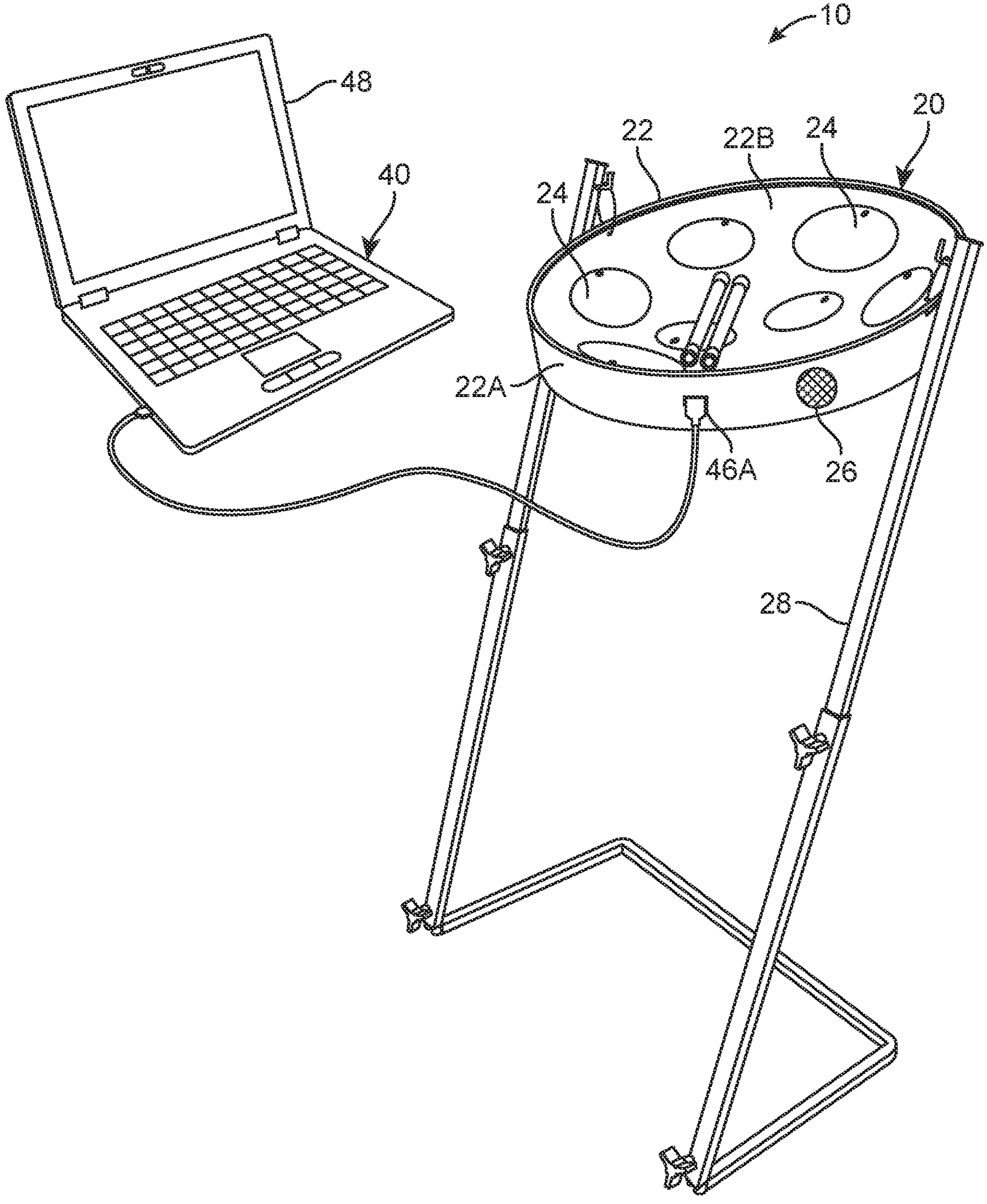
FIG. 2 shows another operational isometric view of electronic steel pan assembly 10 in accordance with an embodiment of the present invention.

Electronic assembly 40 further includes a communication module 46 and an external device 48 as observed in FIG. 2 of the provided drawings. In the present embodiment, communication module 46 is hardware that allows for the system to communicate through wired or wireless means. In an exemplary embodiment, the electronic steel pan may be in wired or wireless communication with an external speaker through Bluetooth or wired means. Additionally, as observed in FIG. 2, the electronic steel pan may also be operatively connected to an external device 48 through a wired connection by way of ports 46A. In the present embodiment, port 46A could be provided as a USB port or any other variation thereof. The electronic steel pan can be operated as a midi-controller when coupled to the external device 48. Electronic steel pan 10 can be implemented as an educational tool to teach students rhythm and learn traditional steel pan configurations. Additionally, the electronic steel pan 10 can serve as an effective tool to be implemented during music production.

The foregoing description conveys the best understanding of the objectives 10 and advantages of the present invention. Different embodiments may be made of the inventive concept of this invention. It is to be understood that all matter disclosed herein is to be interpreted merely as illustrative, and not in a limiting sense.

What is claimed is:

1. A system for an electronic steel pan, comprising:

a) a steel pan assembly including a body comprising a top surface and sidewalls, wherein the top surface includes a plurality of touch pad sensors positioned thereon in a pattern corresponding to musical notes of a traditional steel pan, wherein each of the touch pad sensors light up in different predetermined colors, said body further including a speaker positioned along said sidewalls; and b) an electronic assembly including a controller containing instructions which when executed, cause the system to:

broadcast a pattern by lighting the touch pad sensors in sequence to teach cadence to a user;

read sensor signals generated by the touch pad sensors to generate a touch image pattern wherein the touch image pattern includes information regarding which specific musical notes were activated by the user;

generate a string of audio media that is broadcasted from the speaker corresponding to the touch image pattern, wherein the string of audio media includes specific musical notes corresponding to the touch pad sensors that were activated.

2. The system for an electronic steel pan of claim 1 wherein said touch pad sensors are one of capacitive touch sensors or resistive touch sensors.

3. The system for an electronic steel pan of claim 1 wherein said top surface is concave within the body.

4. The system for an electronic steel pan of claim 1 wherein said steel pan assembly further includes a stand.

5. The system for an electronic steel pan of claim 4 wherein said stand includes extension member operatively engaging with sidewalls of the body and attached to a base on a ground surface.

6. The system for an electronic steel pan of claim 1 wherein said electronic assembly further includes a power source being a rechargeable battery.

7. The system for an electronic steel pan of claim 1 wherein said electronic assembly further includes a communication module comprising ports positioned along the sidewalls of the body.

8. The system for an electronic steel pan of claim 7 wherein said controller is operatively connected to an external device.

9. A system for an electronic steel pan, comprising:

a) a steel pan assembly including a body comprising a top surface and sidewalls defining a cylindrical configuration, wherein said top surface is concave within the body, wherein the top surface includes a plurality of touch pad sensors positioned thereon in a pattern corresponding to musical notes of a traditional steel pan, wherein each of the touch pad sensors light up in different predetermined colors, wherein said touch pad sensors are one of capacitive touch sensors or resistive touch sensors, said body further including a speaker positioned along said sidewalls; and b) an electronic assembly including a power source being operatively coupled to a controller, wherein said electronic assembly further includes a communication module, wherein said controller contains instructions which when executed, cause the system to:

broadcast a rhythmic pattern by lighting the touch pad sensors in sequence to teach cadence to a user;

read sensor signals generated by the touch pad sensors to generate a touch image pattern wherein the touch image pattern includes information regarding which specific musical notes were activated by the user;

generate a string of audio media that is broadcasted from the speaker corresponding to the touch image pattern wherein the string of audio media includes specific musical notes corresponding to the touch pad sensors that were activated.

10. A system for an electronic steel pan, consisting of:

a) a steel pan assembly including a body comprising a top surface and sidewalls defining a cylindrical configuration, wherein said top surface is concave within the body, wherein the top surface includes a plurality of touch pad sensors positioned thereon in a pattern corresponding to musical notes of a traditional steel pan, wherein each of the touch pad sensors light up in different predetermined colors, wherein said touch pad sensors are one of capacitive touch sensors or resistive touch sensors, said body further including a speaker positioned along said sidewalls; and b) an electronic assembly electronic assembly including a power source being operatively coupled to a controller, wherein said electronic assembly further includes a communication module having ports, wherein said electronic assembly includes an external device wired to the communication module via said ports, wherein said controller contains instructions which when executed, cause the system to:

initiate a cycle, during said cycle:

- broadcasting a rhythmic pattern by lighting the touch pad sensors in sequence to teach cadence to a user;
- reading sensor signals generated by the touch pad sensors to generate a touch image pattern, following the broadcasting, said touch image pattern containing a position and a velocity, wherein the touch image pattern includes information regarding which specific musical notes were activated by the user;
- generating a string of audio media, following the reading, that is broadcasted from the speaker corresponding to the touch image pattern, wherein the string of audio media includes specific musical notes corresponding to the touch pad sensors that were activated.

* * * * *